Dec. 22, 1964  A. H. WILLIAMS  3,162,456
SEAL WITH REINFORCED MOUNTING
Filed March 3, 1961

INVENTOR.
ARTHUR H. WILLIAMS
BY
Ernst W. Schultz
ATTORNEY

United States Patent Office 3,162,456
Patented Dec. 22, 1964

3,162,456
SEAL WITH REINFORCED MOUNTING
Arthur H. Williams, Riverside, Ill., assignor to Rex Chainbelt Inc., a corporation of Wisconsin
Filed Mar. 3, 1961, Ser. No. 93,201
3 Claims. (Cl. 277—136)

This invention relates to seals for bearings and particularly to reinforcement of the outer mounting flange which is to fit tightly in the groove of the housing supporting the bearing. With such reinforcement, the seal may be formed of an elastomeric material which provides a more flexible seal as desired particularly for bearings which are intended to accommodate considerable shaft deflection or angular movement.

According to the present invention, a helical spring is placed in the cavity of the mold to engage the outer wall of the part forming the mounting flange so that when the material forming the seal is injected into the cavity, the spring is imbedded in the outer periphery of the mounting flange. The pitch of the spring or the span between the turns of the spring reduces the amount of elastomeric material in the outer flange to provide the same with the additional resistance to circumferential compression as is required to secure the flange in the groove. The normal shrinkage of the elastomeric material after molding leaves the outer dimensions of the spring projecting slightly from the outer diameter of the flange so that each turn of the spring engages the bottom of the groove of the housing to firmly secure the seal against rotation with the shaft.

An object of the invention is to allow the seal to be made of a relatively soft or elastic material.

Another object is to protect the outer flange of the seal which is seated in the groove against damage as in the assembly or disassembly of the bearing or of the seal.

The accompanying drawings show the seal at each end of a bearing housing and in engagement with projecting parts of the inner race of the bearing. The bearing is of the type intended to allow some angularity of the shaft and the projecting parts of the bearing referred to rotate therewith and may be considered a part of the shaft.

Figure 1:
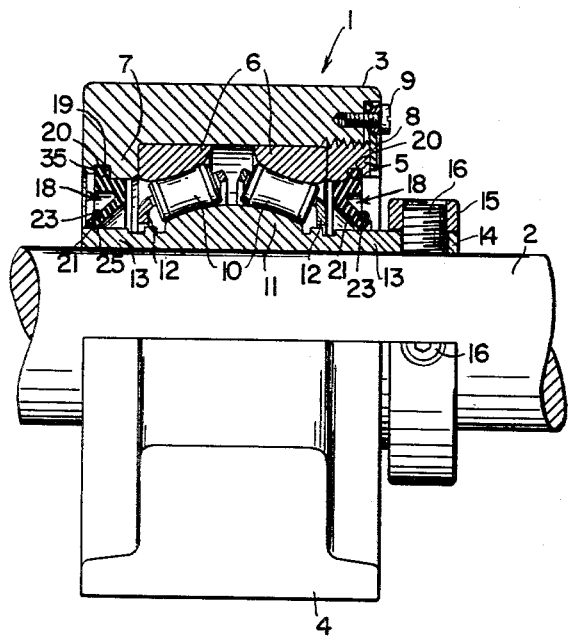
FIGURE 1 shows the bearing broken away and sectioned and the shaft in elevation. The seal is shown directly supported by the bearing housing at one end and in a separate adjustable retaining ring at the other end of the housing.

The bearing 1 shown in FIGURE 1 for supporting shaft 2 includes the housing 3 having a base 4 and the separate ring 5 threadedly mounted in one end of the housing. The outer races 6 of the bearing are disposed in housing 3 between ring 5 and the opposite partially closed end 7 of the housing. The tab 8 secured by screw 9 to housing 3 prevents rotation of ring 5 after the proper spacing of races 6 has been established.

Two series of rolls 10 are provided to operate between races 6 and the spherical inner bearing race 11, and are retained and spaced by the separate cages 12 shown only in part.

Shaft 2 is mounted in the central axial bore of inner race 11 which includes the oppositely extending sleeves 13 formed integrally with race 11. One sleeve 13 is extended as at 14 to project beyond the outer dimensions of housing 3 and carries the retaining ring 15 provided with the locking screws 16. Screws 16 extend through corresponding holes of the sleeve to engage shaft 2 and secure the same in the bore of inner race 11 and sleeves 13.

A seal 18 closes each end of housing 3 and includes an outwardly extending flange 19 which fits within a corresponding annular groove 20 formed in end 7 of housing 3 and ring 5.

Each seal 18 includes the annular flexible lip 21 which extends outwardly of the bearing housing and radially inwardly of the shaft to engage the outer periphery of corresponding sleeves 13.

The garter-spring 23 which is set in the annular groove 24 formed in lip 21 opposite the sharp edge 25 of the lip serves to contract the lip to positively engage the periphery of the sleeve 13.

Bearing 1 is a preferred type of bearing which fully accommodates changes in the axis of rotation of the shaft within limits. Accordingly, lip 21 of seal 18 must have considerable flexibility in order to follow the movement of sleeve 13 and shaft 2. Since the seal is preferably molded of an elastomeric material in one entire piece and includes the mounting flange 19, the flange 19 will be equally flexible and will not have the rigidity necessary to hold the seal in the grooves 20 which are provided. The seal then rotates with the shaft with considerable consequential damage to the seal and possibly the bearing. The provision of the garter-spring 23, of course, adds to the requirements for the securement of the seal against rotation.

Figure 3:
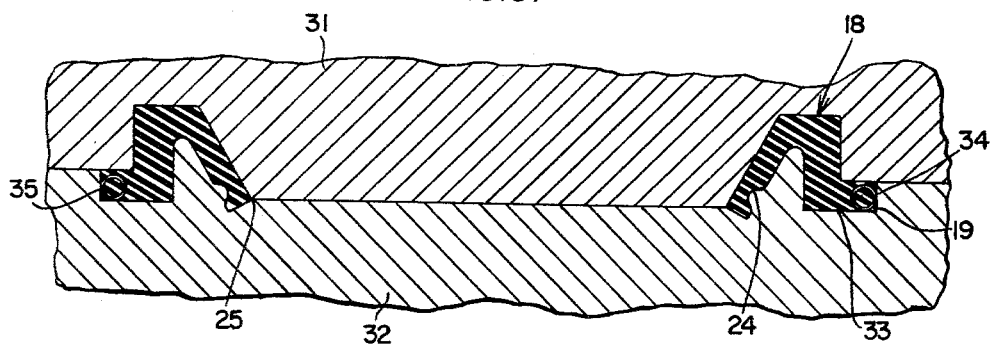
FIG. 3 is a cross-section of the mold showing the relative positioning of the spring in the cavity of the mold.

The seal 18 is molded by injecting the elastomeric material into a mold cavity having the dimensions of the desired part. FIG. 3 is a section through a typical mold and the seal as formed therein. The upper and lower parts 31 and 32, respectively, have adjoining recesses which together form the cavity. The outer portion of the cavity forming flange 19 of seal 18 is located in the lower part 32 of the mold and is defined by the bottom surface 33 which forms one face of flange 19 and the outside wall 34 of the cavity forming the outside of flange 19.

According to the present invention, the spring 35 is formed so that it has a width less than flange 19 and has a length so that it may be placed in the outer portion of the mold cavity with its ends together to provide the spring with a slight circumferential compression which holds the spring against outer wall 34 of the cavity.

With the spring 35 in place, the mold is closed and the material which is then injected into the cavity fills the same including the space within and around the turns of spring 35.

Spring 35 is thereby embedded in flange 19 and according to the invention, when the seal is removed, a slight expansion of the seal is effected by reason of the compression provided the spring when it was placed in the cavity.

Figure 2:
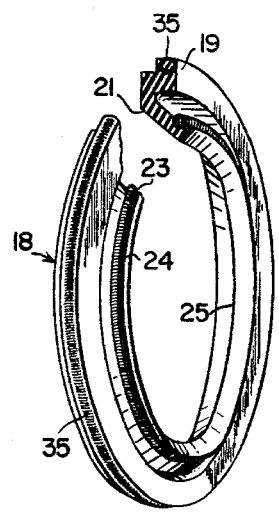
FIG. 2 is a perspective view of the seal with a section thereof broken away and removed to show the construction thereof.
Figure 4:
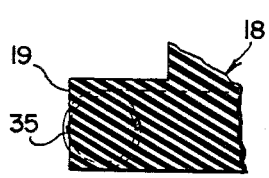
FIG. 4 is an enlarged section of the outer flange of the seal to show the projection of the individual turns of the spring.

Also according to the invention, the spring adjoins the outer dimension of flange 19 and due to the slight shrinkage of the material of the seal which is general, the individual turns of the spring project from the flange 19 as shown in FIGS. 2 and 4.

The completed seal 18 is mounted in housing 3 by bending the seal so that as much of the flange 19 as possible is seated in groove 20. The remaining portion of the seal necessarily overhangs the housing at this point and requires a suitable tool, not shown, which may be inserted in the groove and used to compress the seal circumferentially sufficiently to pass the outer rim of the housing forming the groove. In such assembly the spring 35 protects the flange which slides over the sharp edge of the housing with some force which could otherwise cut or damage the flange. Flange 19 in the free condition should and may have a diameter considerably larger than the bottom of groove 20 so that the flange 19 is provided with an extremely tight fit in the groove with spring 35 firmly seated against the bottom of the groove to prevent any rotation of the seal. The seating pressure is provided by the combined effect of the spring and the elasticity of the material of the seal. That is, the spring itself and the reduced amount of elastomeric material between the turns of the spring determine the force with which the flange is seated in the bottom of the groove.

This force is maintained for a considerable period and is not lessened with any aging of the material of the seal. The seal is thus secured against rotation for its full life even though the seal may be mounted in a groove considerably larger than the mounting flange as is desirable for ease of insertion and removal.

Various modes of carrying out the invention are contemplated as being within the scope of the following claims particularly pointing out and distinctly claiming the subject mtater which is regarded as the invention.

I claim:

1. In a bearing for rotatably supporting a shaft extending therethrough, said bearing having an outer housing with an annular groove at one end of the housing opening inwardly in the direction of the shaft, a seal to close said one end of the housing and having an inwardly extending lip adapted to engage the periphery of a shaft and an outer annular flange of generally rectangular cross-section to fit within said groove of the housing, said seal being molded of elastomeric material and having a helical metal spring imbedded in said flange of the seal and extending substantially continuously around the seal and having a small part of each turn of the spring projecting from the outer diameter of the flange, the turns of said spring being uniformly spaced throughout so that sufficient circumferential compression of the seal is allowed for insertion and securement in said groove as determined by the span of the elastomeric material between said turns and the same circumferential compression is effective to hold the entire outer periphery of said flange including said projecting parts of the spring in radial engagement with the bottom of the groove for preventing rotation of the seal as with the shaft.

2. A seal having an inwardly extending flexible lip adapted to engage the periphery of a shaft and an outer annulur mounting flange of generally rectangular section to fit within the groove of a housing extending around the shaft, said seal being molded of elastomeric material and having a helical metal spring imbedded in the body of the seal and extending substantially continuously around the seal and having parts of each helix projecting from the outer diameter of said flange, the helixes of said spring being uniformly spaced throughout so that sufficient compression of the seal as for insertion in the corresponding groove in which the seal is to be retained is allowed by the span of the elastomeric material between said helixes, and the same circumferential compression is effective to hold the entire outer periphery of said flange including said projecting parts of the spring in radial engagement with the bottom of the groove for preventing rotation of the seal as with the shaft.

3. In a housing for support of a shaft and having an annular groove extending around the shaft, a seal having an inwardly extending flexible lip adapted to engage the periphery of the shaft and an outer annular mounting flange of generally rectangular section to fit within said groove of the housing to close the latter, said seal being molded of elastomeric material and having a helical metal spring imbedded in said flange of the seal and extending substantially continuously around the seal and having parts of each helix projecting from the outer diameter of said flange, the helixes of said spring being uniformly spaced throughout so that sufficient circumferential compression of the seal is allowed for insertion in said groove as determined by the span of the elastomeric material between said helixes, and the same circumferential compression is effective to hold the entire outer periphery of said flange including said projecting parts of the spring in radial engagement with the bottom of the groove for preventing rotation of the seal as with the shaft.

References Cited in the file of this patent

UNITED STATES PATENTS

| | | |
|---|---|---|
| 980,671 | Price | Jan. 3, 1911 |
| 2,275,325 | Searles | Mar. 3, 1942 |
| 2,837,359 | Corsi | June 3, 1958 |
| 2,857,179 | Riesing | Oct. 21, 1958 |
| 2,944,840 | Wiltse | July 12, 1960 |
| 2,957,717 | Bram | Oct. 25, 1960 |